G. B. KOHLER.
MEANS FOR UNLOCKING RECEPTACLES AND DISCHARGING THE CONTENTS THEREOF.
APPLICATION FILED FEB. 12, 1910.
1,011,815.
Patented Dec. 12, 1911.
2 SHEETS—SHEET 2.
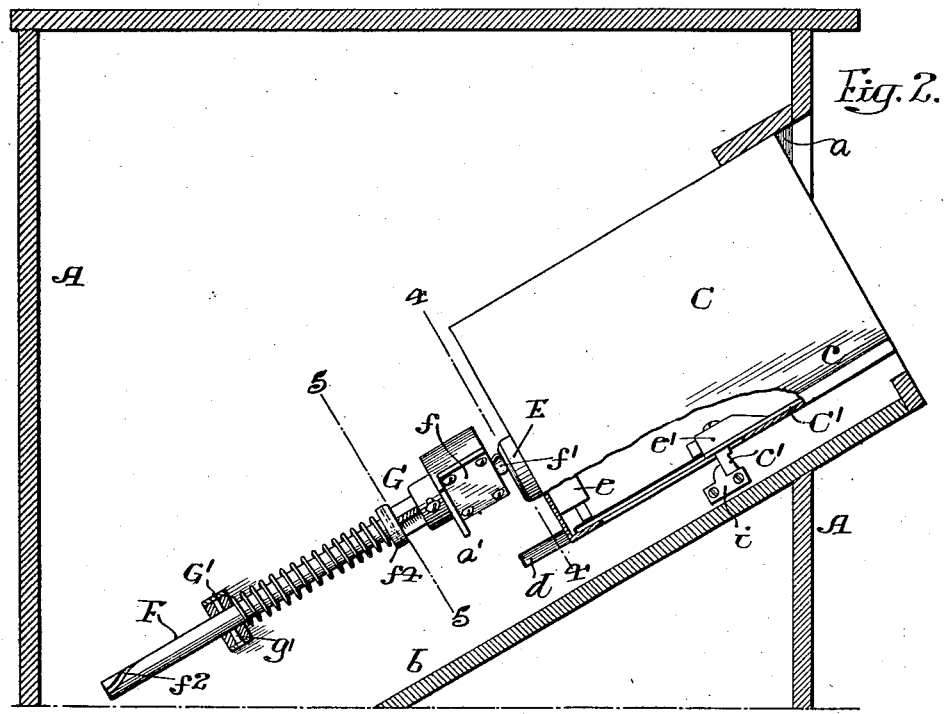
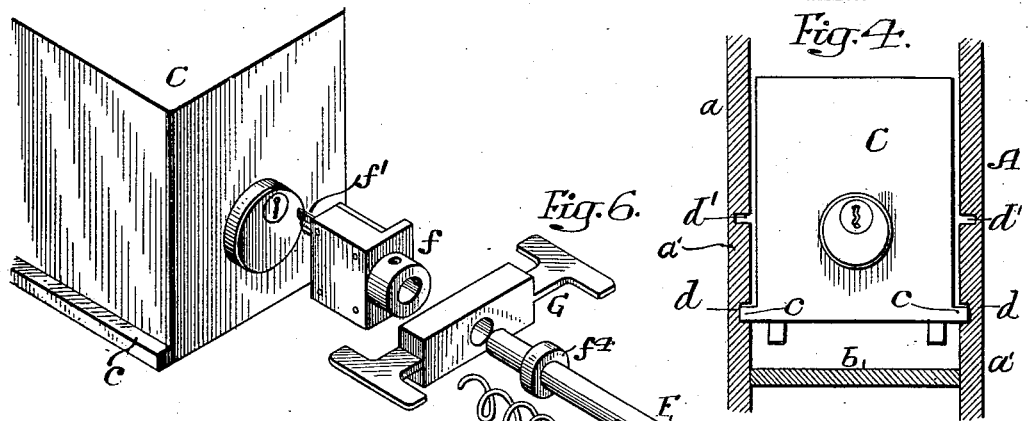
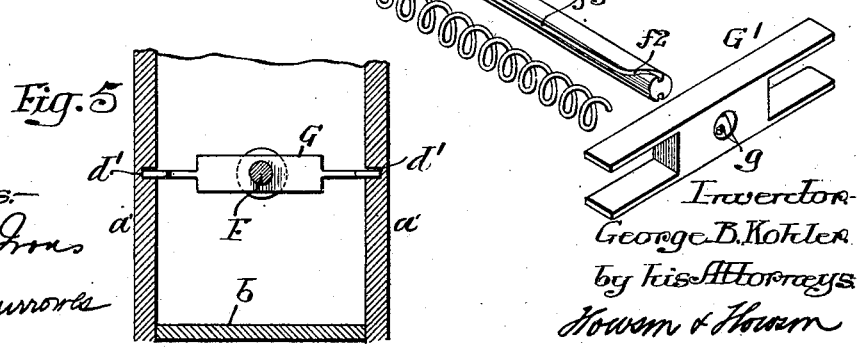

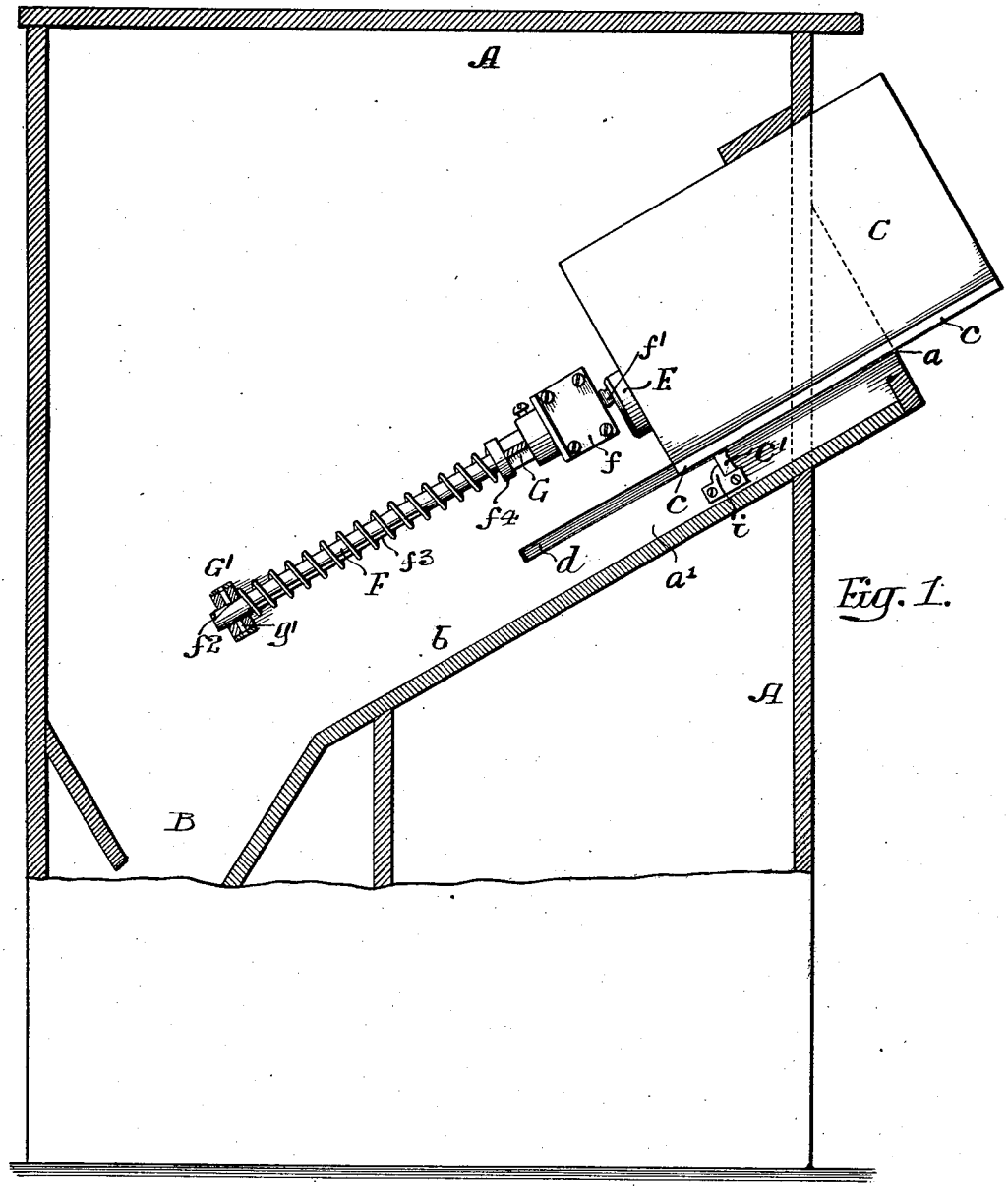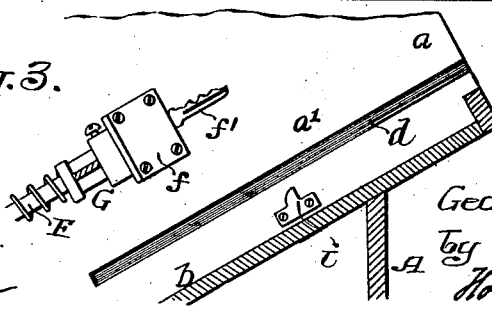

UNITED STATES PATENT OFFICE.

GEORGE B. KOHLER, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

MEANS FOR UNLOCKING RECEPTACLES AND DISCHARGING THE CONTENTS THEREOF.

1,011,815.  Specification of Letters Patent.  Patented Dec. 12, 1911.

Application filed February 12, 1910. Serial No. 543,548.

*To all whom it may concern:*

Be it known that I, GEORGE B. KOHLER, a citizen of the United States, residing in Philadelphia, Pennsylvania, have invented certain Improvements in Means for Unlocking Receptacles and Discharging the Contents Thereof, of which the following is a specification.

The object of this invention is to provide means for automatically opening the lid of a cash or fare receptacle and discharging the contents of the same as fully described hereafter.

The invention is particularly adapted to be used in connection with fare boxes having detachable fare receptacles, the lids of which are closed and locked when the fare receptacle is removed from the box.

In the accompanying drawings:—Figure 1, is a sectional elevation illustrating my invention, the fare receptacle being inverted and in the first position; Fig. 2, is a view similar to Fig. 1, showing the fare receptacle with the cover opened; Fig. 3, is a view showing my invention without the fare receptacle; Fig. 4, is a transverse sectional view on the line 4—4, Fig. 2; Fig. 5, is a transverse sectional view on the line 5—5, Fig. 2; and Fig. 6 is a detached perspective view of the parts.

A is the frame of a counter or table having an opening $a$ for the insertion of the fare receptacle and provided with a drawer or other receiver for the money or fares discharged from the receptacle C. The fare receptacle has a flange $c$ at each side in the present instance which may slide in grooves $d$ in the side walls $a'$ of the frame A, and mounted in the fare receptacle is a sliding cover C' having a projection $c'$ which is used in closing the receptacle when it is removed from the fare box.

The fare receptacle has a lock E, the bolt $e$ of which engages projections $e'$ on the cover when the cover is shifted to the closed position.

In the present instance there are two projections $c'$, one on each side of the cover of the fare receptacle, but the device can be used in connection with a receptacle having one projection.

B is a hopper mounted above the receiver for the money or fares and $b$ is an inclined way extending under the receptacle when it is in position and leading to the hopper B, so as to guide the contents of the receptacle into the hopper.

G, G' are two bearings. The bearing G' is fixed while the bearing G has arms adapted to grooves $d'$, $d'$, in the frame A.

F is a spindle mounted in the bearings G, G', one end of which spindle has a head $f$ carrying a key $f'$ arranged to enter and operate the lock E. In the present instance on the opposite end of the spindle F are spiral grooves $f^2$ into which project pins $g'$ on the bearing G'. These spiral grooves connect with straight grooves $f^3$ in the body of the spindle. A spring H is mounted on the spindle F between the bearing G' and the collar $f^4$ on the spindle and returns the spindle to its normal position when released from the pressure of the receptacle C. The spiral groove $f^2$ causes the spindle to turn the key the required distance to operate the bolt of the lock when the fare receptacle is pushed into the opening $a$.

The operation of the device is as follows:—The fare receptacle when removed from the fare box is closed and the lid locked so that access cannot be had to it except by means of the proper key. This key is carried by the head of the spindle $f$ and is located within the frame A so that the person carrying the fare receptacle from the fare box to the proper office simply inserts the fare box upside down in the opening $a$, with the flanges $c$ in the grooves $d$ and presses against the fare receptacle, causing the key to first enter the lock and then, on continued pressure to turn the spindle owing to the spiral groove therein. When the key is turned the full distance the cover is released and then the projections $c'$ on the cover of the fare receptacle strike lugs $i$ on the frame, and as the body of the fare receptacle is still pushed forward, the cover is retained by the lugs and the fare receptacle opened, and its contents are discharged into the hopper. As soon as the contents of the receptacle are discharged, it is removed and the key is turned back to its original position as the spring causes the head to follow the box, returning the bolt to its normal position, but the lid remains open as there is no projection to close it and the lid is not closed until the receptacle is withdrawn from the fare box.

The ways may be arranged at any suitable angle or may be horizontal, as desired, depending upon the location.

I claim:

1. The combination in means for opening and discharging the contents of locked receptacles having sliding lids; of an inclined slideway arranged to receive the receptacle in an inverted position, a yielding key carrier at the inner end of the slideway, means for causing the key to turn as it is forced back, a fixed lug in the lower portion of the slideway for engaging the sliding lid and holding it while the box continues in its forward movement, allowing the contents of the box to flow therefrom by gravity.

2. The combination in a frame having guides, a receptacle adapted to said guides having a sliding cover, and a lock for securing the cover in its closed position, a projection on the cover, a lug on the frame in the path of the projection, a spirally slotted spindle, a fixed bearing, a pin therein, a sliding bearing carrying the spindle, a spring mounted back of the bearing, a key carried by the spindle and arranged in line with the lock of the box when the box is inserted, so that on the insertion of the box in the grooved frame, the key will enter the lock and on continued movement the key will turn and operate the lock to release the cover and on a still further movement the projections on the cover will strike the lugs on the frame, retaining the cover while the box continues its movement so as to open the box and allow the contents to be discharged.

In testimony whereof, I have signed my name to this specification, in the presence of two subscribing witnesses.

GEORGE B. KOHLER.

Witnesses:
Wm. E. Shupe,
Wm. A. Barr.

---

Copies of this patent may be obtained for five cents each, by addressing the "Commissioner of Patents, Washington, D. C."